United States Patent
Khan et al.

(10) Patent No.: US 7,924,775 B2
(45) Date of Patent: Apr. 12, 2011

(54) APPARATUS AND METHOD FOR SELECTING MODULATION AND FILTER ROLL-OFF TO MEET POWER AND BANDWIDTH REQUIREMENTS

(75) Inventors: Farooq Khan, Allen, TX (US); Jiann-An Tsai, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1089 days.

(21) Appl. No.: 11/699,305

(22) Filed: Jan. 29, 2007

(65) Prior Publication Data

US 2007/0218942 A1    Sep. 20, 2007

Related U.S. Application Data

(60) Provisional application No. 60/783,608, filed on Mar. 17, 2006, provisional application No. 60/786,970, filed on Mar. 29, 2006.

(51) Int. Cl.
*H04W 4/00* (2009.01)
*H04L 1/00* (2006.01)
*H04B 1/38* (2006.01)

(52) U.S. Cl. .................. 370/328; 370/252; 455/561

(58) Field of Classification Search .................. None
See application file for complete search history.

(56) References Cited

U.S. PATENT DOCUMENTS

| | | | |
|---|---|---|---|
| 5,127,024 A * | 6/1992 | Fattouche | 375/295 |
| 6,891,897 B1 * | 5/2005 | Bevan et al. | 375/265 |
| 2004/0002364 A1 * | 1/2004 | Trikkonen et al. | 455/562.1 |
| 2004/0058701 A1 | 3/2004 | Jung et al. | |
| 2004/0141548 A1 | 7/2004 | Shattil | |
| 2004/0218689 A1 | 11/2004 | Akhtman | |
| 2005/0089116 A1 | 4/2005 | Moffatt et al. | |
| 2006/0050623 A1 | 3/2006 | Hartman, Jr. | |
| 2007/0047665 A1 * | 3/2007 | Friend | 375/260 |

OTHER PUBLICATIONS

"Optimum family of spectrum-shaping functions for PAPR reduction in SC-FDMA", Huawei, 3GPP TSG RAN WG1 #43, Seoul, Korea, Nov. 7-11, 2005, 7 pages.
European Search Report dated Dec. 30, 2010 in connection with European Patent Application No. EP 07 10 4328.

\* cited by examiner

*Primary Examiner* — Ricky Ngo
*Assistant Examiner* — Clemence Han

(57) ABSTRACT

A base station for use in a wireless network that communicates according to a multi-carrier protocol. The base station receives an uplink signal transmitted by a first subscriber station. The first subscriber station transmits using a configurable spectral shaping filter and a selectable modulation order. The base station determines a required bandwidth efficiency associated with the first subscriber station and, in response to the determination, selects a first modulation order and a first filter parameter to be used by the first subscriber station. Advantageously, the base station selects the first modulation order and the first filter parameter in order to maximize a power efficiency of the first subscriber station while maintaining the required bandwidth efficiency.

26 Claims, 11 Drawing Sheets

500

| BANDWIDTH EFFICIENCY (BITS/SUBCARRIER) | MODULATION | RRC ROLL-OFF | POWER EFFICIENCY (0.1% PAPR IN dB) |
|---|---|---|---|
| 2 | QPSK | 0.0 | 5.7 |
| 1.6 | QPSK | 0.25 | 4.8 |
| 1.285 | QPSK | 5/9 = 0.5566 | 3.5 |
| 1 | QPSK | 1.0 | 1.8 |
| 1 | $\pi/2$-BPSK | 0.0 | 4.5 |
| 0.8 | $\pi/2$-BPSK | 0.25 | 2.8 |
| 0.64 | $\pi/2$-BPSK | 5/9 = 0.5566 | 1.0 |

| BANDWIDTH EFFICIENCY (BITS/SUBCARRIER) | MODULATION | RRC ROLL-OFF | POWER EFFICIENCY (0.1% PAPR IN dB) |
|---|---|---|---|
| 2 | QPSK | 0.0 | 5.7 |
| 1.6 | QPSK | 0.25 | 4.8 |
| 1.285 | QPSK | 5/9 = 0.5566 | 3.5 |
| 1 | QPSK | 1.0 | 1.8 |
| 1 | π/2-BPSK | 0.0 | 4.5 |
| 0.8 | π/2-BPSK | 0.25 | 2.8 |
| 0.64 | π/2-BPSK | 5/9 = 0.5566 | 1.0 |

APPARATUS AND METHOD FOR SELECTING MODULATION AND FILTER ROLL-OFF TO MEET POWER AND BANDWIDTH REQUIREMENTS

CROSS-REFERENCE TO RELATED APPLICATION(S) AND CLAIM OF PRIORITY

This application is related to Provisional Patent No. 60/783,608, filed Mar. 17, 2006, entitled "Bandwidth and Power Efficient Wireless Communication System", and to Provisional Patent No. 60/786,970, filed Mar. 29, 2006, entitled "Bandwidth and Power Efficient Wireless Communication System and Method". Provisional Patent Nos. 60/783,608 and 60/786,970 are assigned to the assignee of this application and are hereby incorporated by reference. The present application hereby claims priority under 35 U.S.C. §119(e) to Provisional Patent Nos. 60/783,608 and 60/786,970.

TECHNICAL FIELD OF THE INVENTION

The present application relates generally to wireless networks and, more specifically, to an OFDM network that selects modulation type and spectral shaping filter parameters as a function of power and bandwidth efficiency.

BACKGROUND OF THE INVENTION

A Discrete Fourier Transform (DFT)-spread orthogonal frequency division multiplexing (OFDM) or orthogonal frequency division multiple access (OFDMA) system is particularly attractive for use in the uplink channel from a subscriber station to the base station. This is because a DFT-spread OFDM system has low peak-to-average power ratio (PAPR) characteristics. A key design parameter for OFDM and OFDMA power amplifiers is the requirement to minimize the generation of adjacent channel power (ACP) noise—undesired spectral components in adjacent transmission channels. Power amplifiers are more linear at lower input signal levels. Large input signals tend to drive a power amplifier into saturation. Thus, smaller signals experience less distortion and have lower ACP noise.

However, a sudden large signal peak still results in distortion and ACP noise. This is especially problematic in systems that have large peak-to-average power ratios (PAPRs), such as OFDM and OFDMA systems (i.e., multicarrier systems). To avoid this, power amplifiers often operate in back-off (BO) mode (i.e., reduced input signal) in order to accommodate large signal peaks. DFT-spread OFDM/OFDMA minimizes the PAPR in the uplink, which allows the subscriber station amplifier to operate with a smaller amount of back-off and provides the subscriber stations with higher transmit power and data rate.

Conventional DFT-spread OFDM/OFDMA systems may also use spectral shaping filters to reduce PAPR. However, the modulation type used by a subscriber station to transmit in the uplink is selected without taking into consideration the power efficiency resulting from signal spectral shaping. This results in poor selection of modulation type, thereby degrading the overall system throughout and performance.

Therefore, there is a need for improved multi-carrier (e.g., OFDM, OFDMA) transmission systems that minimize amplifier peak-to-average power ratio (PAPR) without suffering performance degradation. In particular, there is a need to maximize the performance of DFT-spread OFDM transmission techniques.

SUMMARY OF THE INVENTION

An improved base station is provided for use in a wireless network capable of communicating with a plurality of subscriber stations according to a multi-carrier protocol. The base station receives an uplink signal transmitted by a first subscriber station. The first subscriber station is capable of transmitting in the uplink using a configurable spectral shaping filter and using a plurality of selectable modulation orders. The base station determines a required bandwidth efficiency associated with the first subscriber station and, in response to the determination, selects a first modulation order to be used by the first subscriber station to transmit in the uplink. Advantageously, the base station selects the first modulation order in order to maximize a power efficiency of the first subscriber station while maintaining the required bandwidth efficiency.

In another embodiment, the base station further selects a first filter parameter to be used to configure the spectral shaping filter in the first subscriber station. Advantageously, the base station selects the first modulation order and the first filter parameter in order to maximize a power efficiency of the first subscriber station while maintaining the required bandwidth efficiency.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 5 is a table listing exemplary bandwidth and power efficiency values for different modulation types and varying filter roll-off values;

DETAILED DESCRIPTION OF THE INVENTION

Figure 1:
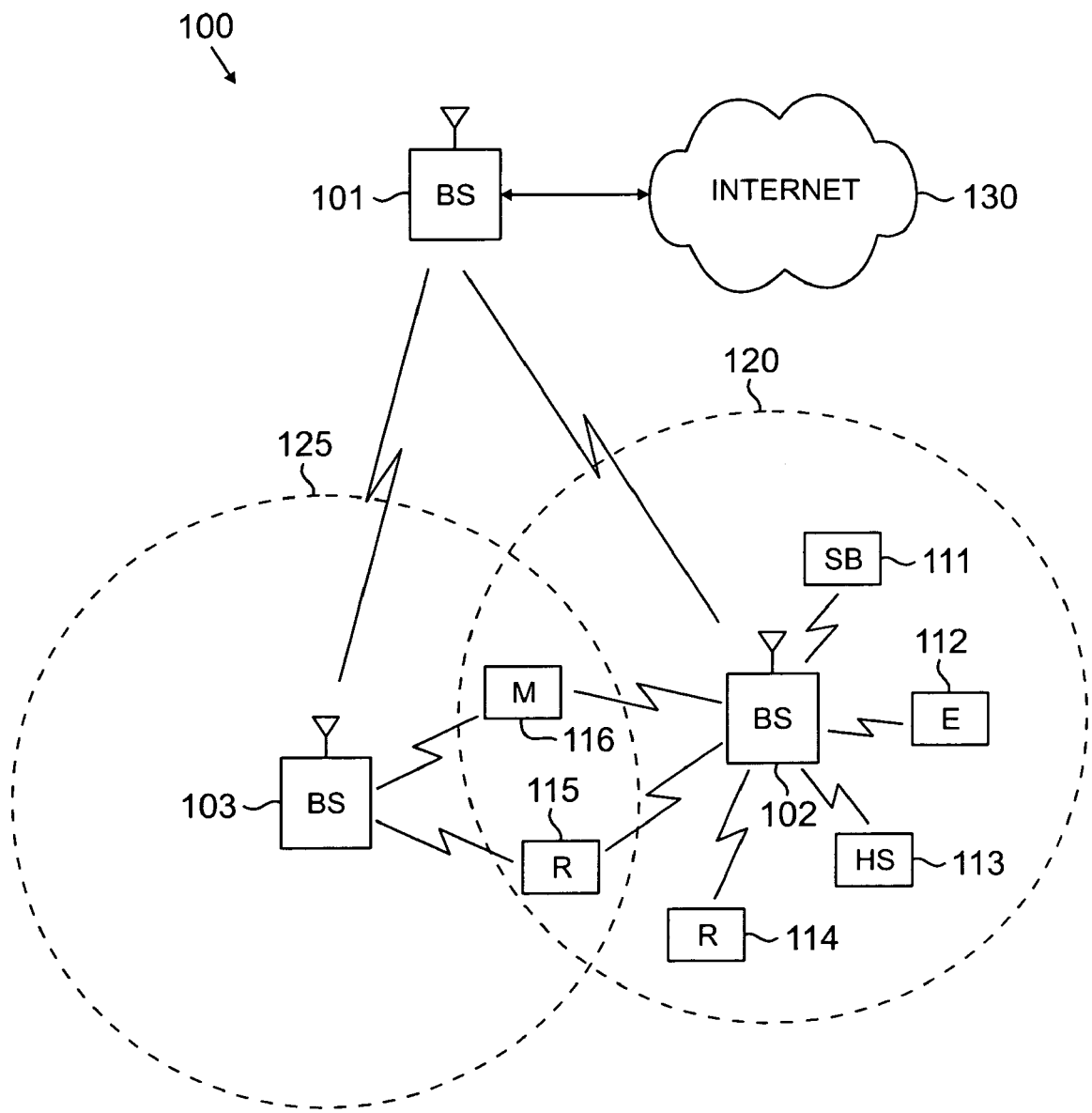
FIG. 1 illustrates an exemplary wireless network that selects modulation type and spectral shaping filter parameters as a function of power and bandwidth efficiency according to the principles of the present disclosure.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

This application is related to U.S. patent application Ser. No. 11/374,928 for "Apparatus And Method For FT Pre-Coding Of Data To Reduce PAPR In A Multi-Carrier Wireless Network", filed Mar. 14, 2006, to U.S. patent application Ser. No. 11/374,863 for "Apparatus And Method For FT Pre-Coding Of Data And Control Signals To Reduce PAPR In A Multi-Carrier Wireless Network", filed Mar. 14, 2006, and to U.S. patent application Ser. No. 11/518,506 for "Apparatus And Method For Reduced Peak-To-Average-Power Ratio In A Wireless Network", filed Sep. 7, 2006. U.S. patent application Ser. Nos. 11/374,928, 11/374,863 and 11/518,506 are assigned to the assignee of this application and are hereby incorporated by reference into the present application as if fully set forth herein.

In the disclosed embodiment, a Discrete Fourier Transform (DFT)-spread OFDMA (or OFDM) transmission scheme is used for the uplink (i.e., subscriber station-to-base station link) of a wireless system due to its low peak-to-average power (PAPR) characteristic. This is due to the limited transmit power available in a subscriber station (or mobile station). A low PAPR requires less back-off and allows a subscriber station to transmit at a higher power and higher data rate, thereby improving the coverage and spectral efficiency of a wireless system. It will be understood that a DFT-spread OFDMA (or OFDM) transmission scheme may also be used for the downlink (i.e., base station-to-subscriber station link). However, the use of a DFT-spread OFDMA scheme is not as critical in the downlink due to the greater transmit power available to base stations.

In an advantageous embodiment of the present disclosure, the DFT-spread OFDMA (or OFDM) transmission scheme may perform an FFT pre-coding of the coded modulation symbols prior to mapping at the input to the IFFT block, as disclosed in U.S. patent application Ser. No. 11/374,928, filed Mar. 14, 2006 and entitled "Apparatus And Method For FT Pre-Coding Of Data To Reduce PAPR In A Multi-Carrier Wireless Network. At the receiver, frequency-domain equalization (FDE) is performed after the FFT operation. An IFFT operation is then performed on the equalized symbols in order to obtain the data modulation symbols.

According to the principles of the present disclosure, the peak-to-average power ratio (PAPR) of the DFT-spread OFDMA/OFDM signals may be further reduced by spectral shaping of the FFT pre-coded data before mapping to the input of the IFFT block. U.S. patent application Ser. No. 11/518,506 for "Apparatus And Method For Reduced Peak-To-Average-Power Ratio In A Wireless Network", filed Sep. 7, 2006 and incorporated by reference above discloses exemplary embodiments of spectral shaping. It is noted that the order of the spectrum shaping and the mapping may be reversed. The spectral shaping (SS) filter reduces spectral efficiency due to the transition band of the SS filter. Examples of spectrum shaping filters are the Raised Cosine Nyquist filter, the Gaussian filter, the Hamming filter, the Hann filter, and others. Arbitrary spectrum shaping filters also may be designed based on empirical data, such as from simulations.

FIG. 1 illustrates exemplary wireless network 100, which selects modulation type and spectral shaping filter parameters as a function of power and bandwidth efficiency according to the principles of the present disclosure. In the illustrated embodiment, wireless network 100 includes base station (BS) 101, base station (BS) 102, base station (BS) 103, and other similar base stations (not shown). Base station 101 is in communication with base station 102 and base station 103. Base station 101 is also in communication with Internet 130 or a similar IP-based network (not shown).

Base station 102 provides wireless broadband access (via base station 101) to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access (via base station 101) to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

Base station 101 may be in communication with either a greater number or a lesser number of base stations. Furthermore, while only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those skilled in the art.

Figure 2A:
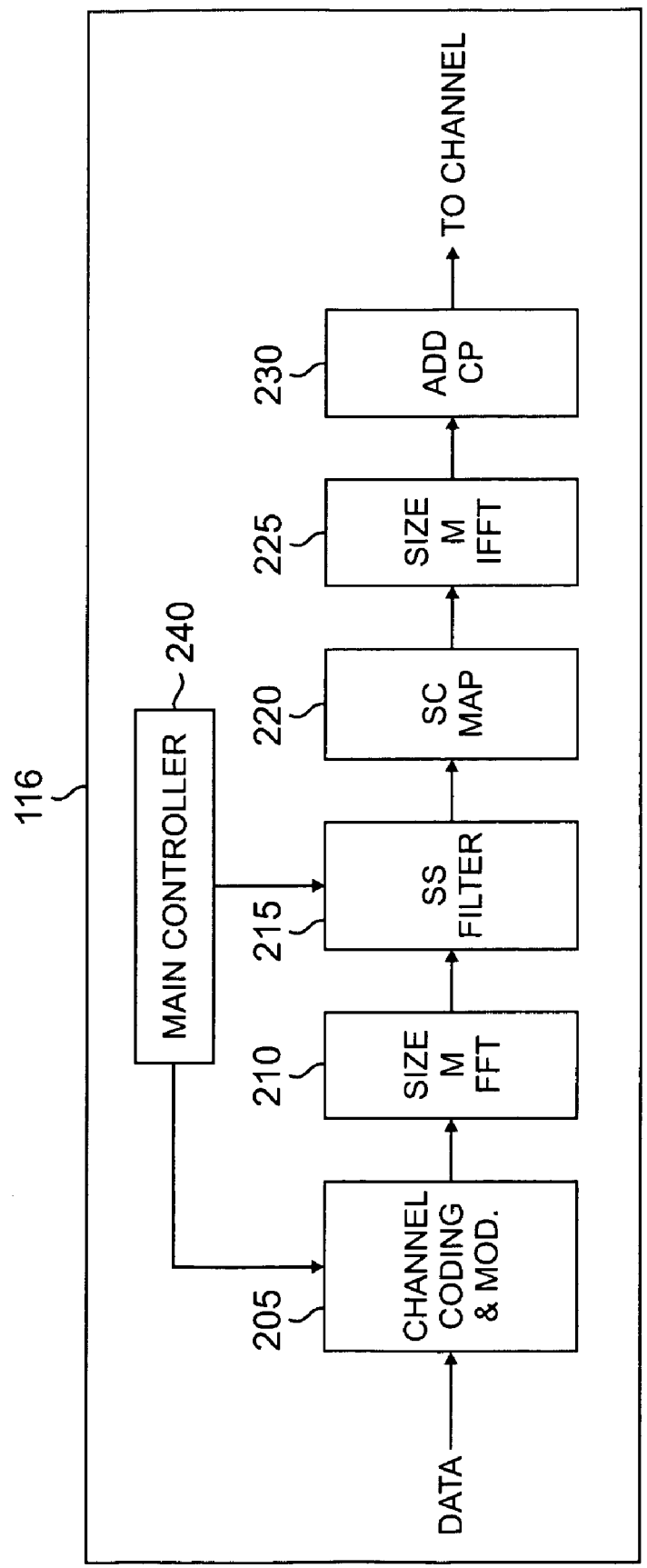
FIG. 2A is a high-level diagram of an orthogonal frequency division multiple access (OFDMA) transmit path.
Figure 2B:
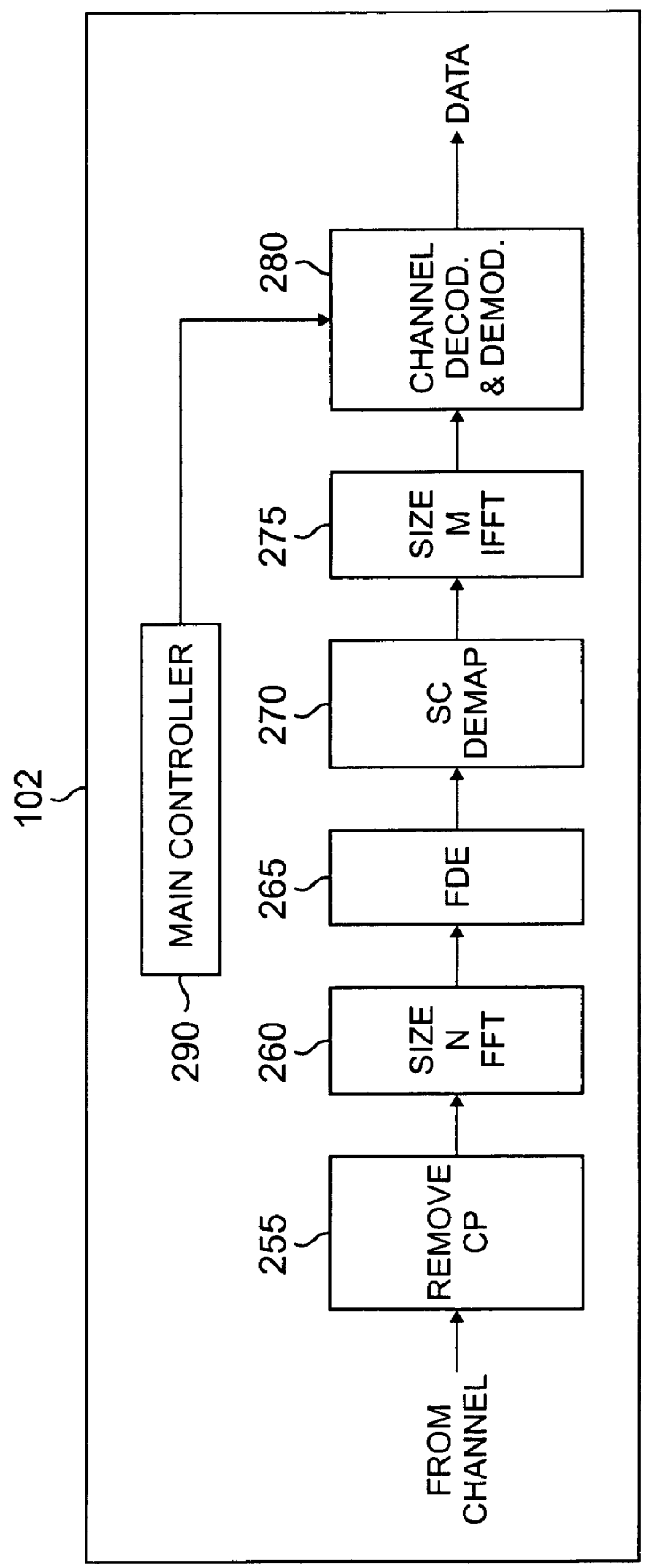
FIG. 2B is a high-level diagram of an orthogonal frequency division multiple access (OFDMA) receive path.

FIG. 2A is a high-level diagram of an orthogonal frequency division multiple access (OFDMA) transmit path. FIG. 2B is a high-level diagram of an orthogonal frequency division multiple access (OFDMA) receive path. In FIGS. 2A and 2B, the OFDMA transmit path is implemented in subscriber station (SS) 116 and the OFDMA receive path is implemented in base station (BS) 102 in order to depict modulation type selection, FFT pre-coding operations, and spectral shaping filtering operations in the uplink (i.e., transmission from subscriber station to base station). However, it will be understood by those skilled in the art that the OFDMA transmit path may also be implemented in BS 102 and the OFDMA receive path may be implemented in SS 116 for downlink operations.

The transmit path in subscriber station (SS) 116 comprises channel coding and modulation block 205, Size M FFT block 210, spectral shaping (SS) filter block 215, subcarrier (SC) mapping block 220, Size N IFFT block 225, add cyclic prefix (CP) block 230, and main controller 240. The receive path in base station (BS) 102 comprises remove cyclic prefix (CP) block 255, Size N FFT block 260, frequency domain equalization (FDE) block 265, subcarrier demapping block 270, Size M IFFT block 275, channel decoding and demodulation block 280, and main controller 290.

According to the principles of the present disclosure, main controller 290 in base station (BS) 102 and main controller 240 in subscriber station (SS) 116 communicate using control channel messages to establish the selected modulation type and spectral shaping filter parameters. BS 102 may regularly schedule SS 116 to transmit in the uplink or may selectively schedule SS 116 in response to a message from SS 116 indicating that SS 116 has a packet ready for transmission. In an advantageous embodiment of the disclosure, main controller 290 in BS 102 may perform the calculations and related process steps indicated in the flow diagrams in FIGS. 6-9. However, in alternate embodiments of the disclosure, main controller 240 in SS 116 may perform at least some of the calculations and other process steps indicated in the flow diagrams in FIGS. 6-9. In still another embodiment, main controller 290 may not be a part of BS 102, but may instead be an external control device associated with wireless network 100 that performs the same functions for BS 102.

At least some of the components in FIGS. 2A and 2B may be implemented in software while other components may be implemented by configurable hardware or a mixture of software and configurable hardware. In particular, it is noted that the FFT blocks and the IFFT blocks described in this disclosure document may be implemented as configurable software algorithms, where the values of Size M and Size N may be modified according to the implementation.

Furthermore, although the text and figures of the disclosure are directed to an embodiment that implements the Fast Fourier Transform and the Inverse Fast Fourier Transform, this is by way of illustration only and should not be construed to limit the scope of this disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the values of the M and N variables may be any integer numbers (i.e., 1, 2, 3, 4, etc.), while for FFT and IFFT functions, the values of the M and N variables may be any integer numbers that are powers of two (i.e., 1, 2, 4, 8, 16, etc.).

Channel coding and modulation block 205 receives incoming data traffic bits and performs channel coding (e.g., turbo coding, Viterbi coding, etc.) and modulation to produce a stream of symbols. According to the principles of the present disclosure, main controller 240 controls and configures channel coding and modulation block 205 to implement the selected modulation type and channel coding rate. Size M FFT block 210 then FFT pre-codes the data symbols by performing a size M FFT operation. After the FFT operation, spectral shaping filter block 215 performs spectral shaping according to the selected filter design, including Raised Cosine Nyquist filter, the Gaussian filter, the Hamming filter, the Hann filter, and others. It is noted that main controller 240 also controls and configures spectral shaping filter block 215 according to the selected filter parameters.

Next, subcarrier mapping block 215 maps the spectrally-shaped, FFT pre-coded symbols to a selected set of subcarriers of the total of N subcarriers at the input of Size N IFFT block 225. Any additional control information, such as a pilot signal, is also mapped to predetermined subcarriers inputs of Size N IFFT block 225. Next, Size N IFFT block 225 performs a size N IFFT operation to generate a time domain signal. Add cyclic prefix (CP) block 230 adds a cyclic prefix to the time-domain signal from Size N IFFT block 225 before up-conversion (not shown) to RF range for transmission.

A sequence of reverse operations is performed in the receive path in base station (BS) 102. The receive path in BS 102 comprises down-conversion circuitry (not shown) that generates a baseband signal from the received radio frequency (RF) signal. After down-conversion, remove cyclic prefix block 255 removes the cyclic prefix from the time-domain baseband signal. Size N FFT block 260 converts the baseband signal to a frequency domain signal. FDE block 265 uses the known pilot signals to perform equalization on the data and other controls signals. The control and signaling information that was not FFT pre-coded is recovered directly from the outputs of FDE block 265. Subcarrier demapping block 270 demaps the FFT pre-coded data from selected ones of the outputs of FDE block 265 to the inputs of Size M IFFT block 275. Size M IFFT block 275 receives the FFT pre-coded data traffic from subcarrier demapping block 270 and performs a size M IFFT operation to recover the coded and modulated data symbols. Finally, channel decoding and demodulation block 280 demodulates and decodes the data symbols to recover the original user data traffic bits. According to the principles of the present disclosure, main controller 290 controls and configures channel decoding and demodulation block 280 to implement the selected modulation type and channel coding rate.

It is noted that the transmit path and receive path components described herein and illustrated in FIGS. 2A, 2B, 3A and 3B are configurable devices that may be re-programmed and controlled by main controller 240 in SS 116 and main controller 290 in BS 102. For the purposes of simplicity and clarity, main controllers 240 and 290 are not illustrated in FIGS. 3A and 3B.

Thus, for example, main controller 240 is operable to configure channel coding and modulation block 205 to adapt to different modulation techniques (e.g., BPSK, QPSK, QAM, etc.) as described below. Similarly, main controller 240 is operable to configure SS filter 215 to implement different filter types and to adjust the filter parameters for each filter type. Main controller 240 is also operable to modify the values of M and N. In BS 102, main controller 290 is similarly capable of configuring, for example, FDE block 265, subcarrier demapping block 270, channel decoding and demodulation block 280, and to modify the values of M and N.

Figure 3A:
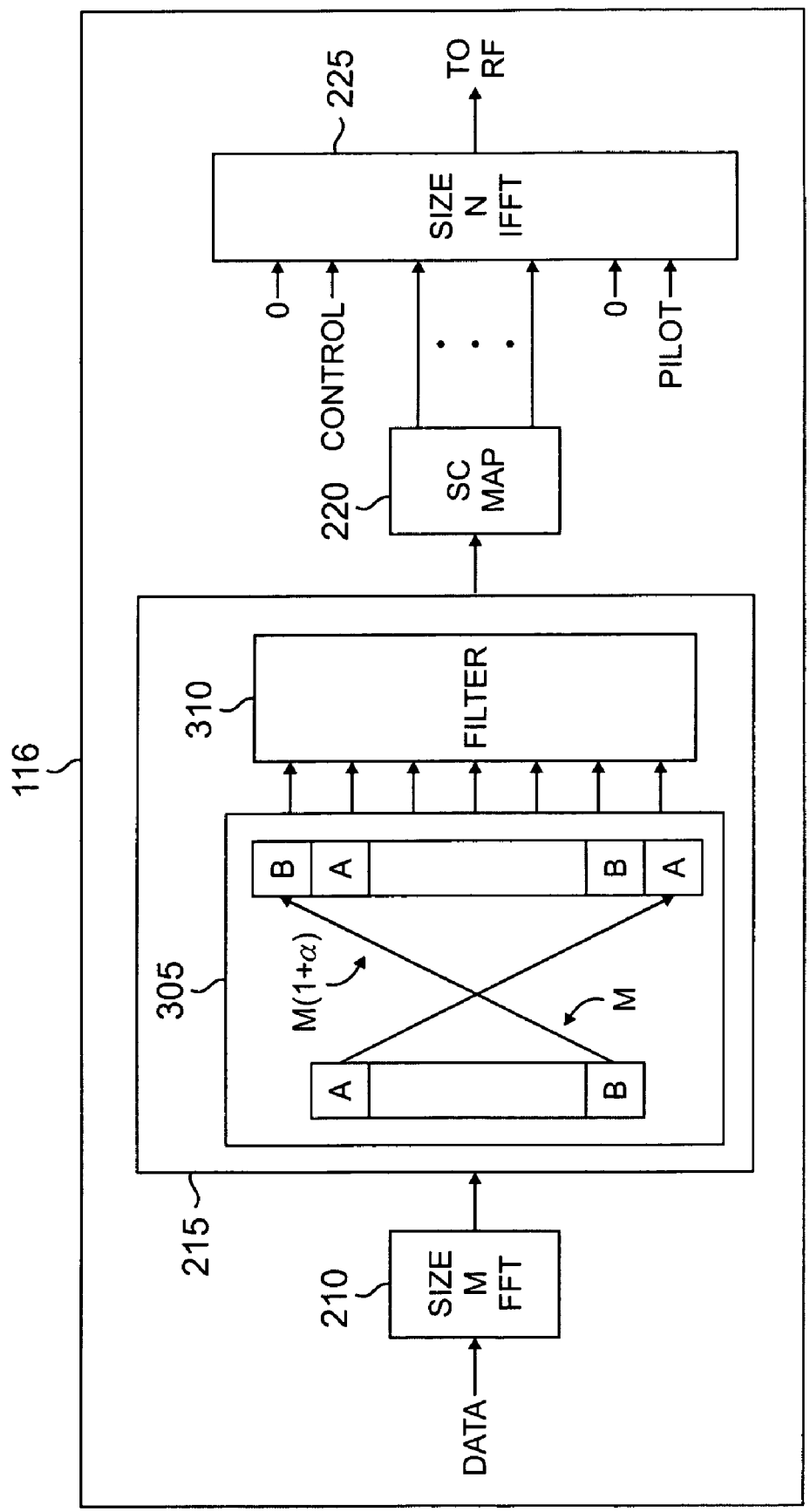
FIG. 3A illustrates selected portions of the OFDMA transmit path in the subscriber station in greater detail.
Figure 3B:
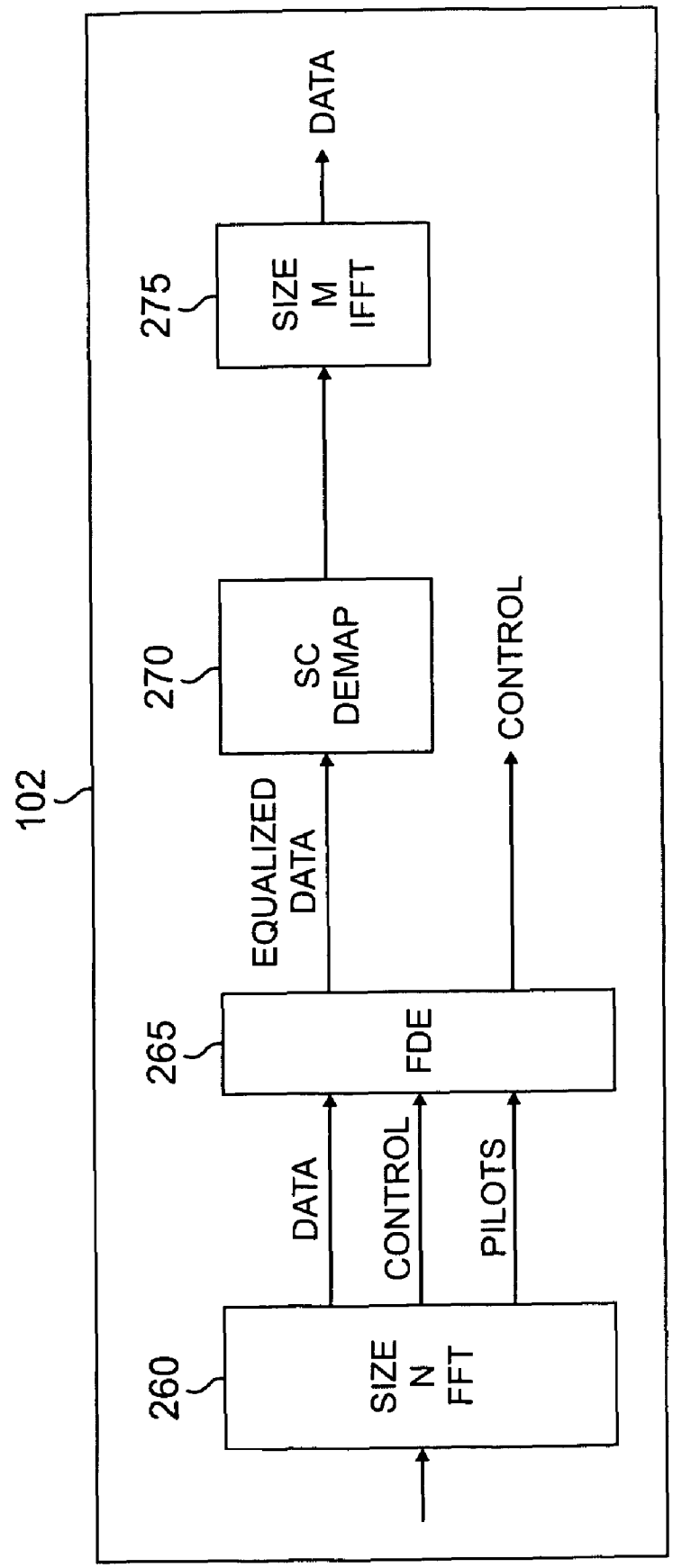
FIG. 3B illustrates selected portions of the OFDMA receive path in the base station in greater detail.

FIG. 3A illustrates selected portions of the OFDMA transmit path in subscriber station (SS) 116 in greater detail. FIG. 3B illustrates selected portions of the OFDMA receive path in base station (BS) 102 in greater detail. FIGS. 3A and 3B illustrate the selective FFT pre-coding of data, spectral shaping filtering, and frequency domain equalization (FDE) according to an embodiment of the present disclosure.

In SS 116, Size M FFT block 210 pre-codes the data traffic by performing a size M FFT operation. The M FFT pre-coded symbols from Size M FFT block 210 are then spectrally shaped by spectral shaping (SS) filter block 215. In this example, SS filter block 215 may be a raised cosine Nyquist filter, also known as a cosine roll-off filter. More particularly, SS filter block 215 may be a root-raised-cosine (RRC) filter.

SS filter block 215 comprises sample pre-arranging stage 305 and filter stage 310. Sample pre-arranging stage 305 copies a block of A samples from a first end of the original sequence of M samples to the second end of the original sequence. Similarly, sample pre-arranging stage 305 copies a block of B samples from the second end of the original sequence of M samples to the first end of the original sequence. Thus, if M samples are input to sample pre-arranging stage 305, then the number of samples at the output of sample pre-arranging stage 305 is $M(1+\alpha)$. Next, filter stage 310 performs the spectral shaping filter operations that multiply the samples from sample pre-arranging stage 305 by the filter coefficients.

The roll-off factor, $\alpha$, determines the excess bandwidth of the filter. For example, if M=64 and $\alpha$=0.25, then the number of samples at the output of SS filter block 215 is 64(1+0.25) =80. Thus, eighty (80) subcarriers are required to map these samples at the input of Size N IFFT block 225. This represents 25% excess bandwidth. Subcarrier (SC) mapping block 220 then maps the $M(1+\alpha)$=80 subcarriers to a selected subset of the OFDMA subcarriers (i.e., tones) at the inputs of Size N IFFT lock 225. Assuming IFFT size of N, the remaining $N-M(1+\alpha)$ inputs of Size N IFFT block 225 may receive a non-FFT pre-coded pilot signal, a non-FFT pre-coded control signal, or a zero input signal.

Next, Size N IFFT block 225 performs a size N IFFT operation on the FFT pre-coded data symbols, the pilot signal (s), the other signaling and control signal(s), and the zero input signal(s), if any. In an alternate embodiment, at least some of the signaling and control signals may also be FFT pre-coded. Finally, the outputs of Size N IFFT block 225 are passed on to add CP block 230 (not shown) and then to the radio frequency (RF) circuitry (not shown) for up-conversion.

In BS 102, Size N FFT block 260 performs a size N FFT operation on the received signal to recover the FFT pre-coded data, the non-FFT pre-coded pilot signal, the zero input signals (not shown), and the other control signals, which, in this case, are also not FFT pre-coded. Next, FDE block 265 uses the recovered pilot signal to equalize the FFT pre-coded data and the non-FFT pre-coded control signals in the frequency-domain. The received frequency-domain pilot information is used for channel estimation and equalization purposes.

It is noted that the pilot symbols were inserted in SS 116 just before the IFFT operation, so that FFT pre-coding is not used for the pilot symbols. Therefore, pilot symbol transmission happens in the frequency-domain. This assures that a reliable channel estimate is available in the frequency-domain for frequency-domain equalization.

Next, subcarrier (SC) demapping block 270 maps the M equalized data symbols to selected inputs of Size M IFFT block 275. Finally, Size M IFFT block 275 converts the equalized data symbols from the frequency domain to the time domain.

As noted previously, in a conventional DFT-spread OFDMA wireless network, the modulation type used by a subscriber station to transmit in the uplink is selected without taking into consideration the power efficiency resulting from signal spectral shaping. The present disclosure provides a new approach to using spectral shaping filters in the subscriber station, wherein the selection of modulation type and spectral-shaping filter parameters are jointly made by taking into consideration the power efficiency resulting from spectral shaping of the transmitted signal.

Figure 4A:
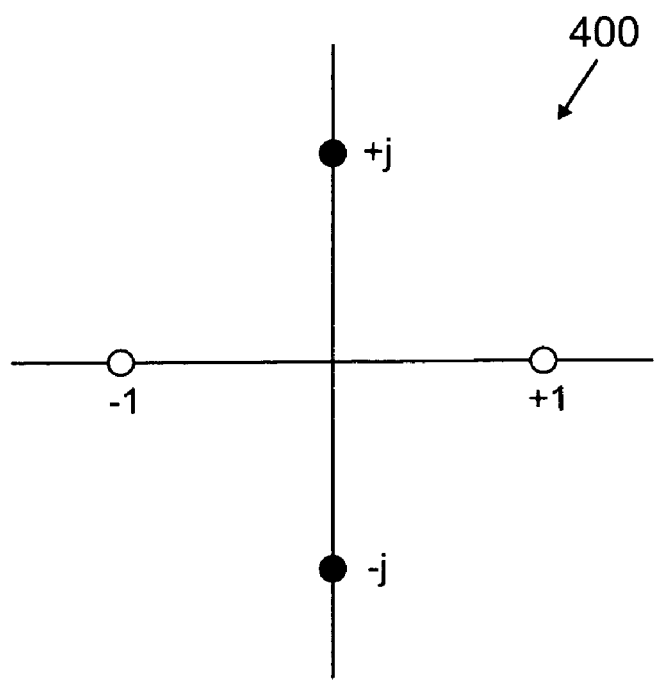
FIG. 4A illustrates a π/2-shifted binary phase shift keying (BPSK) modulation constellation.

FIG. 4A illustrates $\pi/2$-shifted binary phase shift keying (BPSK) modulation constellation 400. The $\pi/2$-BPSK modulation is a modification to conventional BPSK modulation, wherein a phase shift of $\pi/2$ is applied to every second BPSK symbol. For example, the binary sequence [1011] is transmitted as the sequence [+1 −1 +1 +1] in conventional BPSK modulation, but is transmitted as the sequence [+1 −j+1 +j] in $\pi/2$-BPSK modulation. A $\pi/2$ phase shift every second symbol results in a lower PAPR radio frequency (RF) signal. Therefore, $\pi/2$-BPSK modulation is suitable for use in power limited situations.

Figure 4B:
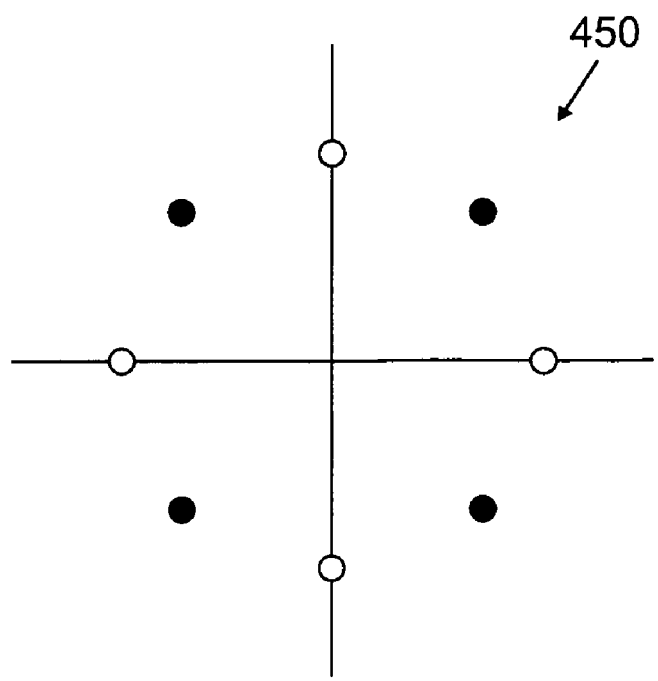
FIG. 4B illustrates a π/4-shifted quadrature phase shift keying (QPSK) modulation constellation.

FIG. 4B illustrates $\pi/4$-shifted quadrature phase shift keying (QPSK) modulation constellation 450. The $\pi/4$-QPSK modulation is a modification to conventional QPSK modulation, wherein a phase shift of $\pi/4$ is applied to every second BPSK symbol. A $\pi/4$-QPSK modulation also results in a lower PAPR relative to a simple QPSK constellation.

FIG. 5 depicts table 500, which lists exemplary bandwidth and power efficiency values for different modulation types and varying values of the filter roll-off parameter. It is known that as the modulation order decreases, the bandwidth efficiency also decreases. It is also noted that as the value of the root-raised-cosine (RRC) filter roll-off parameter increases for a particular modulation order (or type), the bandwidth efficiency also decreases. However, as the modulation order (or type) decreases or the filter roll-off value increases, the power efficiency goes up. The power efficiency is represented as 0.1% PAPR (i.e., the probability of 0.1% that the PAPR is greater than the number stated in the last column of FIG. 5). It is noted that the PAPR goes down as the modulation order decreases or the filter roll-off value increases.

Figure 6:
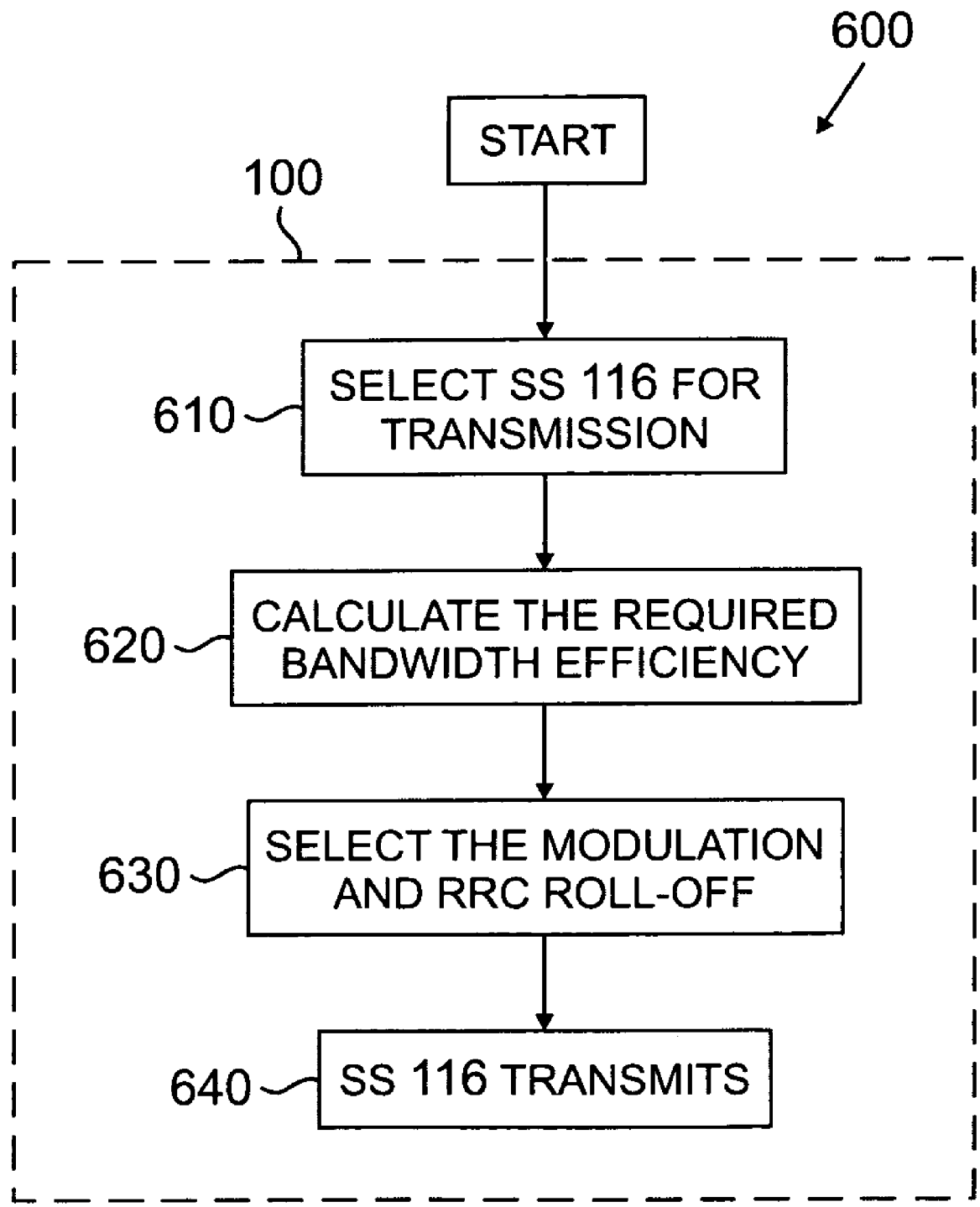
FIG. 6 is a flow diagram illustrating a method for selecting modulation type and filter roll-off based on bandwidth efficiency requirement.

FIG. 6 depicts flow diagram 600, which illustrates a method for selecting modulation type and the value of the filter roll-off parameter based on bandwidth efficiency requirement in wireless network 100. Initially, subscriber station (SS) 116 may indicate in a control channel that SS 116 has a packet to transmit in the uplink. BS 102 then selects SS 116 for transmission (process step 610). Next, main controller 290 in BS 102 calculates the required bandwidth efficiency (process step 620).

Next, main controller 290 selects a modulation order (or type) for SS 116 and selects an RRC roll-off value from a look-up table similar to table 500 in FIG. 5 (process step 630). In FIG. 6, main controller 290 selects the modulation order and roll-off value that provides the best power efficiency, while meeting the required bandwidth efficiency. For example, if a bandwidth efficiency of 1 bit/subcarrier is required, main controller 290 may select QPSK modulation with an RRC roll-off value of 1.0, instead of $\pi/2$-BPSK modulation with an RRC roll-off value of 0.0. It is noted that QPSK modulation and $\pi/2$-BPSK modulation both provide the required bandwidth efficiency of 1 bit/subcarrier. However, QPSK with an RRC roll-off value of 1.0 has better power efficiency (1.8) than the power efficiency (4.5) of $\pi/2$-BPSK modulation with an RRC roll-off value of 0.0. After the modulation order (or type) and roll-off value are selected, SS 116 transmits the data packet using the selected modulation and roll-off value (process step 640).

Figure 7:
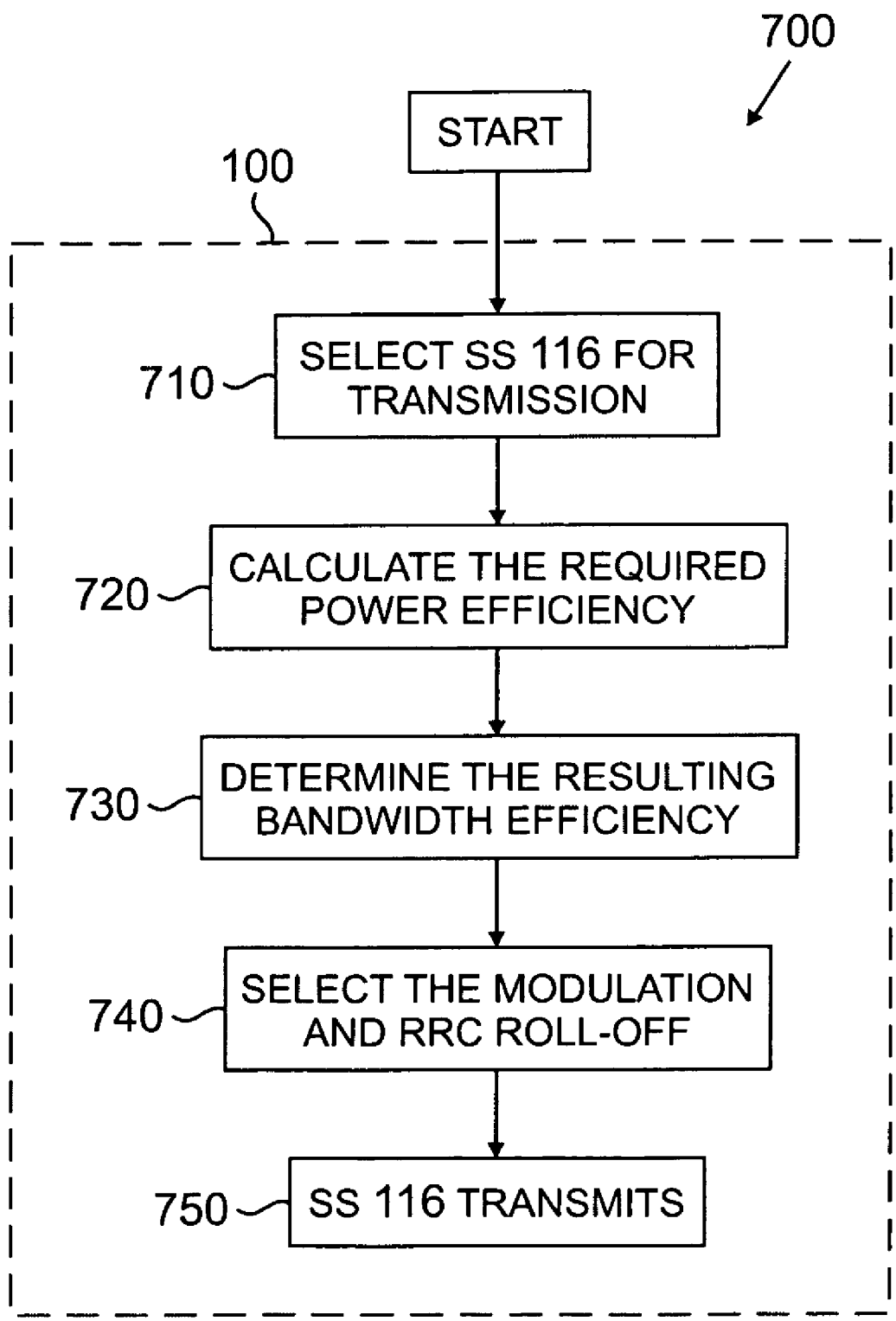
FIG. 7 is a flow diagram illustrating a method for selecting modulation type and filter roll-off based on power efficiency requirement.

FIG. 7 depicts flow diagram 700, which illustrates a method for selecting modulation type and filter roll-off based on power efficiency requirement in wireless network 100. Initially, subscriber station (SS) 116 may indicate in a control channel that SS 116 has a packet to transmit in the uplink. BS 102 then selects SS 116 for transmission (process step 710). Next, main controller 290 in BS 102 calculates the required power efficiency (process step 720). After the power efficiency is calculated, main controller 290 determines the resulting bandwidth efficiency (process step 730).

Next, main controller 290 selects a modulation order (or type) for SS 116 and selects an RRC roll-off value from a look-up table similar to table 500 in FIG. 5 (process step 740). After the modulation order (or type) and RRC roll-off value are selected, SS 116 transmits the data packet using the selected modulation and RRC roll-off value (process step 750).

Unlike the method in FIG. 6, the required power efficiency is first calculated in FIG. 7. For example, this may occur is SS 116 is power-limited user, such as when SS 116 is located at the cell edge. In the case of a power-limited subscriber station, the subscriber station transmits at peak power in order to achieve a reliable transmission. In such a scenario, power efficiency is more important than bandwidth efficiency. Therefore, power efficiency is first determined and then a modulation order and an RRC roll-off value (factor) are selected that provide the best bandwidth efficiency corresponding to the determined power efficiency. For example if a user require a power efficiency equivalent of 1.2 dB PAPR, then $\pi/2$-BPSK modulation with an RRC roll-off value of 5/9, which provides bandwidth efficiency of 0.64 bits/subcarrier may be selected.

Figure 8:
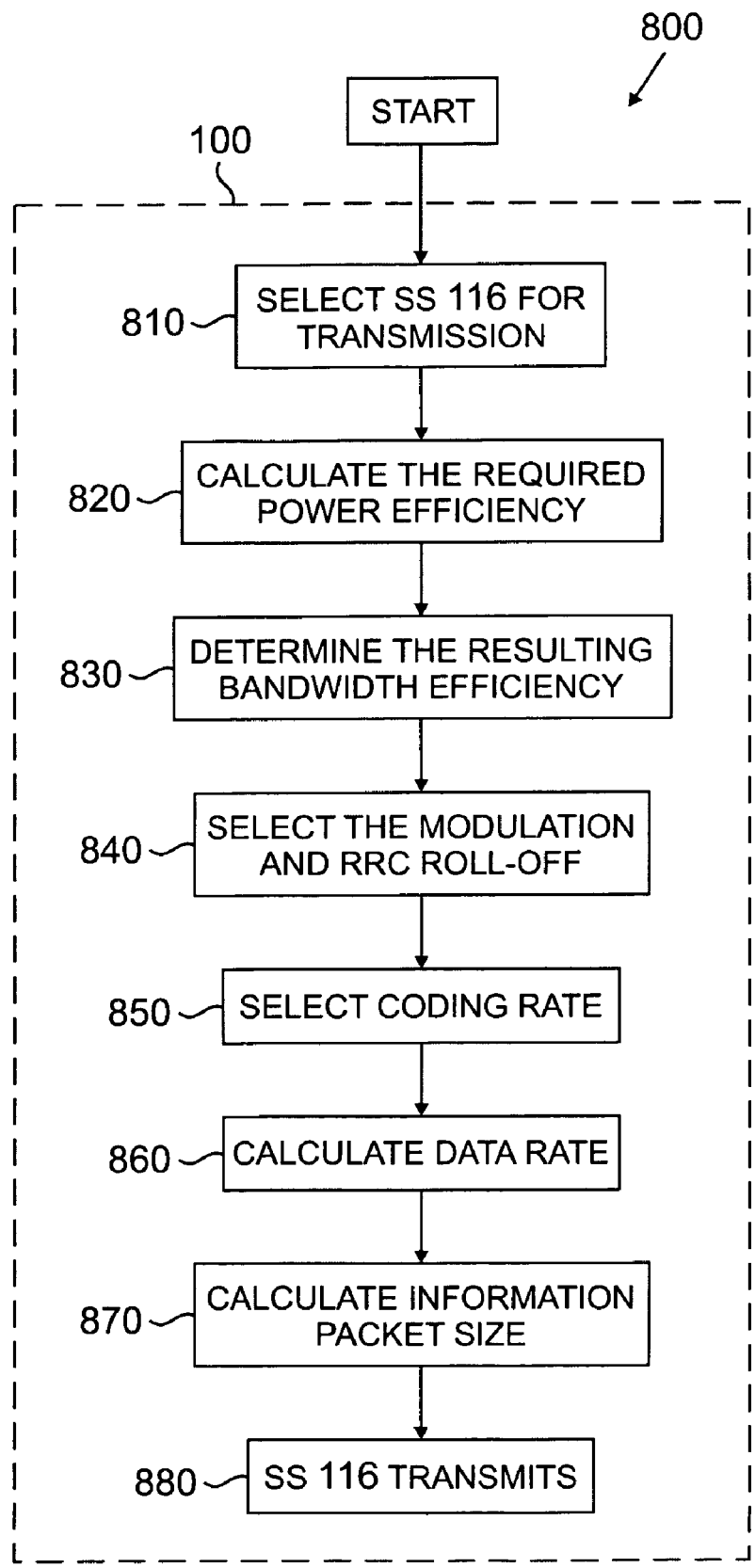
FIG. 8 is a flow diagram illustrating a method for selecting modulation type, filter roll-off, and channel coding rate.

FIG. 8 depicts flow diagram 800, which illustrates a method for selecting modulation type, filter roll-off, and channel coding rate in wireless network 100. The first few steps in FIG. 8 are the same as in FIG. 7. Initially, subscriber station (SS) 116 may indicate in a control channel that SS 116 has a packet to transmit in the uplink. BS 102 then selects SS 116 for transmission (process step 810). Next, main controller 290 in BS 102 calculates the required power efficiency (process step 820). After the power efficiency is calculated, main controller 290 determines the resulting bandwidth efficiency (process step 830). Next, main controller 290 selects a modulation order (or type) for SS 116 and selects an RRC roll-off value from a look-up table (process step 840).

After selecting the modulation and filter roll-off, main controller 240 determines the channel coding rate and the subsequent transmission is performed at the resulting data rate (process step 850). Channel coding adds redundancy to the transmitted data, but reduces the transmitted information bit rate. For example, $\pi/2$-BPSK modulation with an RRC roll-off value of 5/9 provides bandwidth efficiency of 0.64 bit/subcarrier. However, if a coding rate of 1/2 is used, the information bandwidth efficiency is only 0.3 bit/subcarrier. Therefore, main controller 290 calculates an information data rate (process step 860) and a packet size (process step 870) corresponding to an information bandwidth efficiency of 0.32 bit/subcarrier when $\pi/2$-BPSK modulation with RRC roll-off value of 5/9 and channel coding rate of 1/2 are used for transmission. Finally, SS 116 transmits the uplink data using the selected modulation order, RRC roll-off, coding rate, data rate, and packet size (process step 880).

Figure 9:
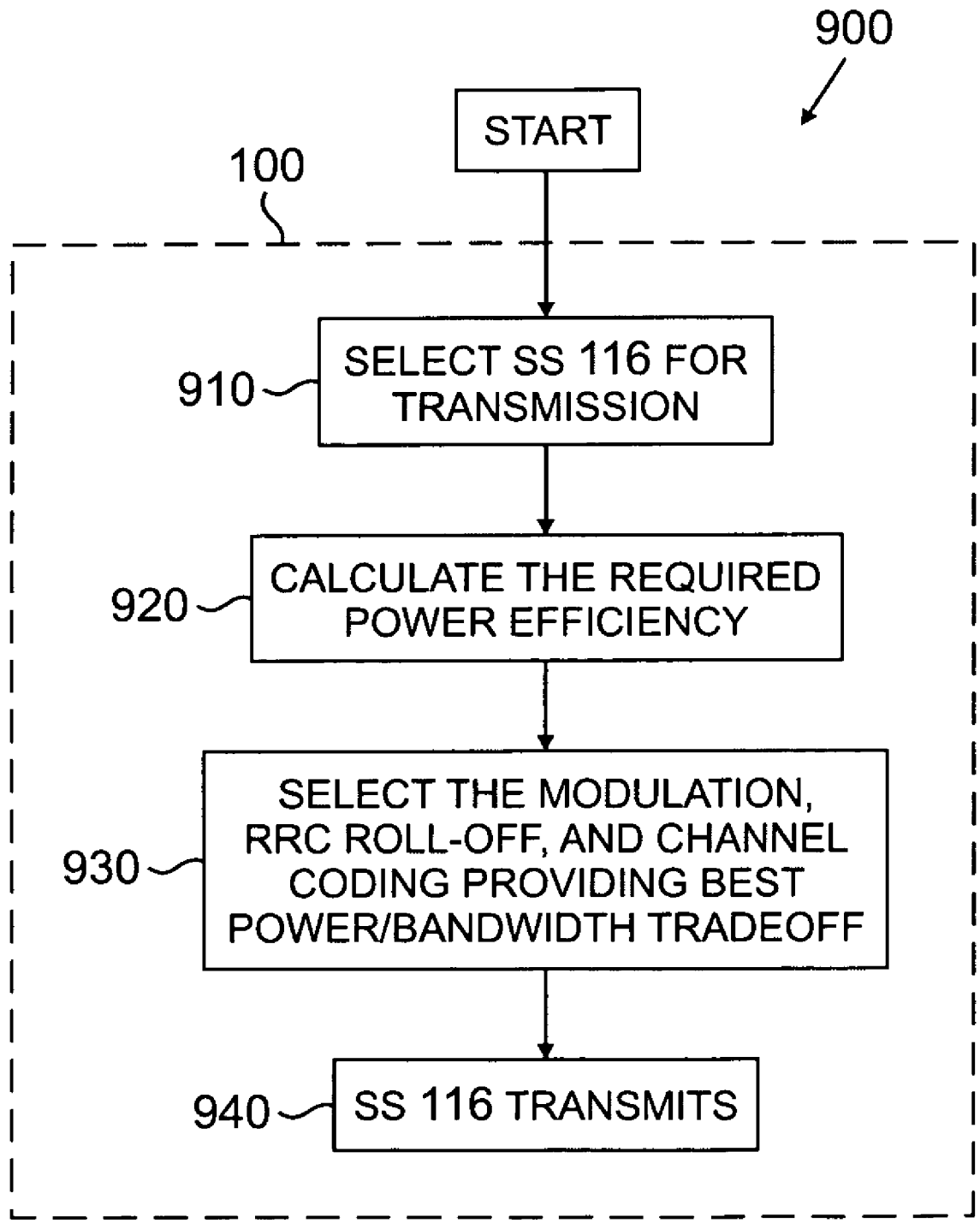
FIG. 9 is a flow diagram illustrating a method for selecting an optimal combination of modulation type, filter roll-off, and channel coding rate.

FIG. 9 depicts flow diagram 900, which illustrates a method for selecting an optimal combination of modulation type, filter roll-off, and channel coding rate in wireless network 100. In FIG. 9, BS 102 selects modulation, filter roll-off and channel coding rate in order to jointly optimize those value. Initially, subscriber station (SS) 116 may indicate in a control channel that SS 116 has a packet to transmit in the uplink. BS 102 then selects SS 116 for transmission (process step 910). Next, main controller 290 in BS 102 calculates the required power efficiency (process step 920). BS 102 then selects modulation order, RRC roll-off value, and channel coding to provide the best trade off between power efficiency and bandwidth efficiency (process step 930). Finally, SS 116 transmits the uplink data using the selected modulation order, RRC roll-off, and channel coding rate (process step 940).

It is noted that channel coding provides link performance gain in terms of the required bit energy. Therefore, the link performance gain due to channel coding may be interpreted as the gain in terms of power efficiency. In general, a stronger channel coding results in larger link performance gain at the expense of bandwidth inefficiency, due to the redundancy added by the channel coding process. Similarly, it is noted that a larger roll-off value provides larger gain in terms of power efficiency. However, a larger roll-off value also results in lower bandwidth efficiency, because the filtering process adds redundancy in the transmission due to the excess bandwidth required. Therefore, in FIG. 9, modulation order, filter RRC roll-off value, and the channel coding rate may be selected jointly in order to provide the best power and bandwidth efficiency tradeoff.

The present disclosure describes an embodiment that selects between only a few modulation orders and only a few RRC filter types. However, those skilled in the art will understand that the principles of the present disclosure also apply to other modulation types and other filter types.

The present disclosure introduces the joint selection of modulation and filter roll-off to meet a given bandwidth efficiency requirement, while still providing the best possible power efficiency. The present disclosure also introduces joint selection of modulation and filter roll-off to meet a given power efficiency requirement, while still providing the best possible bandwidth efficiency. Finally, the present disclosure introduces the joint selection of modulation, filter roll-off and channel coding rate to provide the best tradeoff between power efficiency and bandwidth efficiency.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a wireless network configured for communication with a plurality of subscriber stations according to a multi-carrier protocol, a base station operable to receive an uplink signal transmitted by a subscriber station, the subscriber station configured to transmit in the uplink using a configurable spectral shaping filter and using a plurality of selectable modulation orders, wherein the base station is configured to:
   determine a required power efficiency associated with the subscriber station; and
   select a modulation order and a filter parameter to be used by the subscriber station to transmit in the uplink, the modulation order and the filter parameter selected to maximize a bandwidth efficiency of the subscriber station while maintaining the required power efficiency.

2. The base station as set forth in claim 1, wherein the modulation order is one of binary phase shift keying (BPSK) modulation and quadrature phase shift keying (QPSK) modulation.

3. The base station as set forth in claim 1, wherein the filter parameter is used to configure the spectral shaping filter in the subscriber station.

4. The base station as set forth in claim 3, wherein the filter parameter comprises a root raised cosine (RRC) roll-off parameter.

5. The base station as set forth in claim 3, wherein the base station further selects a channel coding rate to be used by the subscriber station to transmit in the uplink.

6. The base station as set forth in claim 5, wherein the base station selects the modulation order, the filter parameter, and the channel coding rate in order to maximize a power efficiency of the subscriber station while maintaining a required bandwidth efficiency.

7. The base station as set forth in claim 5, wherein the base station selects the modulation order, the filter parameter, and the channel coding rate in order to provide an optimum tradeoff between power efficiency and bandwidth efficiency in the subscriber station.

8. For use in a wireless network configured for communication with a plurality of subscriber stations according to a multi-carrier protocol, a method of communicating in an uplink between a base station and a subscriber station, the subscriber station configured to transmit in the uplink using a configurable spectral shaping filter and using a plurality of selectable modulation orders, the method comprising the steps of:
   determining a required power efficiency associated with the subscriber station; and
   selecting a modulation order and a filter parameter to be used by the subscriber station to transmit in the uplink, the modulation order and the filter parameter selected to maximize a bandwidth efficiency of the subscriber station while maintaining the required power efficiency.

9. The method as set forth in claim 8, wherein the modulation order is one of binary phase shift keying (BPSK) modulation and quadrature phase shift keying (QPSK) modulation.

10. The method as set forth in claim 8, wherein the filter parameter is used to configure the spectral shaping filter in the subscriber station.

11. The method as set forth in claim 10, wherein the filter parameter comprises a root raised cosine (RRC) roll-off parameter.

12. The method as set forth in claim 10, further comprising the step of selecting a channel coding rate to be used by the subscriber station to transmit in the uplink.

13. The method as set forth in claim 12, wherein the steps of selecting the modulation order, selecting the filter parameter, and selecting the channel coding rate maximize a power efficiency of the subscriber station while maintaining a required bandwidth efficiency.

14. For use in a wireless network configured for communication with a plurality of subscriber stations according to a multi-carrier protocol, a base station operable to receive an uplink signal transmitted by a subscriber station, the subscriber station configured to transmit in the uplink using a configurable spectral shaping filter and using a plurality of selectable modulation orders, wherein the base station is configured to:
   determine a required power efficiency associated with the subscriber station; and
   select a modulation order, a filter parameter, and a data rate to be used by the subscriber station to transmit in the uplink, the modulation order and the filter parameter selected to maximize a bandwidth efficiency of the subscriber station while maintaining the required power efficiency.

15. The base station as set forth in claim 14, wherein the modulation order is one of binary phase shift keying (BPSK) modulation and quadrature phase shift keying (QPSK) modulation.

16. The base station as set forth in claim 14, wherein the filter parameter is used to configure the spectral shaping filter in the subscriber station.

17. The base station as set forth in claim 16, wherein the filter parameter comprises a root raised cosine (RRC) roll-off parameter.

18. The base station as set forth in claim 16, wherein the base station further selects a channel coding rate to be used by the subscriber station to transmit in the uplink.

19. The base station as set forth in claim 18, wherein the base station selects the modulation order, the filter parameter, and the channel coding rate in order to maximize a bandwidth efficiency of the subscriber station while maintaining a required power efficiency.

20. The base station as set forth in claim 18, wherein the base station selects the modulation order, the filter parameter, and the channel coding rate in order to provide an optimum tradeoff between power efficiency and bandwidth efficiency in the subscriber station.

21. For use in a wireless network configured for communication with a plurality of subscriber stations according to a multi-carrier protocol, a method of communicating in an uplink between a base station and a subscriber station, the subscriber station configured to transmit in the uplink using a configurable spectral shaping filter and using a plurality of selectable modulation orders, the method comprising the steps of:
   determining a required power efficiency associated with the subscriber station; and
   selecting a modulation order, a filter parameter, and a data rate to be used by the subscriber station to transmit in the uplink, the modulation order and the filter parameter selected to maximize a bandwidth efficiency of the subscriber station while maintaining the required power efficiency.

22. The method as set forth in claim 21, wherein the modulation order is one of binary phase shift keying (BPSK) modulation and quadrature phase shift keying (QPSK) modulation.

23. The method as set forth in claim 21, filter parameter is used to configure the spectral shaping filter in the subscriber station.

24. The method as set forth in claim 23, wherein the filter parameter comprises a root raised cosine (RRC) roll-off parameter.

25. The method as set forth in claim 23, further comprising the step of selecting a channel coding rate to be used by the subscriber station to transmit in the uplink.

26. The method as set forth in claim 25, wherein the steps of selecting the modulation order, selecting the filter parameter, and selecting the channel coding rate maximize a bandwidth efficiency of the subscriber station while maintaining a required power efficiency.

* * * * *